UNITED STATES PATENT OFFICE.

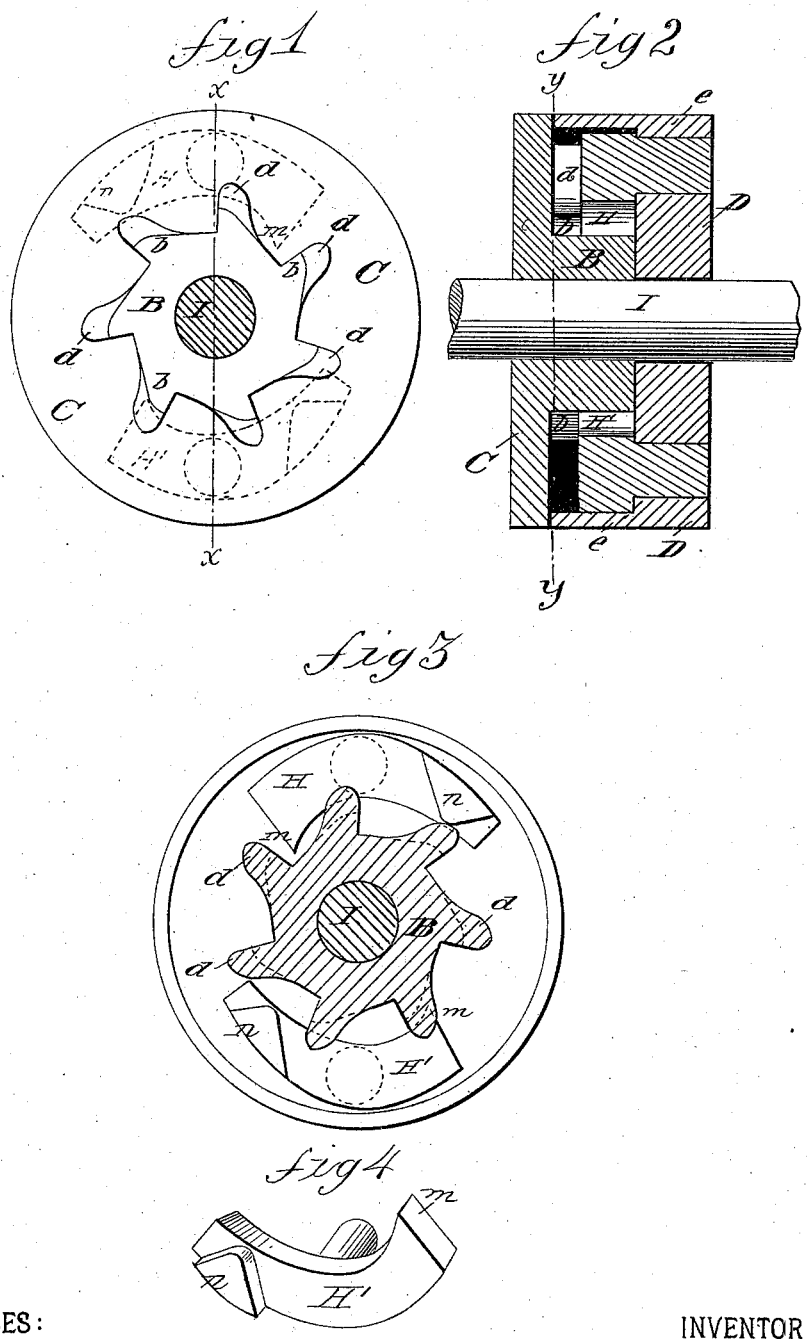

WALDO A. LOUD, OF SPRINGFIELD, MASSACHUSETTS, ASSIGNOR TO THE BLAIR MANUFACTURING COMPANY, OF SAME PLACE.

PAWL AND RATCHET.

SPECIFICATION forming part of Letters Patent No. 305,697, dated September 23, 1884.

Application filed July 14, 1884. (No model.)

*To all whom it may concern:*

Be it known that I, WALDO A. LOUD, a citizen of the United States, residing at Springfield, in the county of Hampden and State of Massachusetts, have invented new and useful Improvements in Pawls and Ratchets, of which the following is a specification.

My invention relates to an improved pawl-and-ratchet mechanism; and it consists, in brief, of a wheel having one portion of its periphery formed into a ratchet-wheel, and the other and contiguous portion provided with raised cams, in combination with a hinged pawl arranged to have one end come opposite to and engage with the ratchet, and its other provided with a cam-block to come opposite to and engage with the cams, the rotation of the pawls over a fixed ratchet-wheel, or the rotation of the wheel inside of a pawl having a fixed hinge, operating to vibrate the pawl, through the alternate action of the ratchet and cam surfaces, to positively, and without the interposition of gravity or springs, form a mechanism for continuing rotation in one direction.

My invention is fully illustrated in the accompanying drawings, in which Figure 1 is a plan view of a wheel of my construction attached to the face of a disk. Fig. 2 is a section on the line $x\ x$ of Fig. 1, and of a shell or pulley journaling two pawls and operatively arranged relative to the wheel. Fig. 3 is a plan view in partial section on $y\ y$ of Fig. 2, and Fig. 4 is a perspective view of one pawl.

B is a wheel, having a portion of its periphery divided into the ratchet-teeth $b$, and the other portion into an equal number of cams, $d$.

C is a disk, of which the wheel B is shown in the drawings to be an integral part.

D is a shell journaling the pawls H H' upon opposite sides of the axis of wheels B, and presenting an outside pulley-surface, $e$.

I is an axial shaft to the disk C and shell D.

The pawls H are formed substantially as shown in Fig. 4, to have the detent $m$ upon one end and the cam-block $n$ upon the other, and relieved from its side to come opposite the cams $d$ when the end $m$ shall be opposite to the teeth $b$.

In the drawings the wheel B is shown spaced into an uneven number of teeth and cams, so that the two pawls H H', as arranged, alternately engage the ratchet surface of said wheel at an interval equal to one-half of the space between said teeth. In a wheel with many teeth the pawls may be multiplied, to, in effect, have one of their number always in engagement therewith.

In operation the rotation of the disk C in its free direction will vibrate the pawls H H', each ratchet-tooth lifting one end of a pawl to clear it, and a cam coming into operation upon cam-block $n$ to cause the end of a pawl which has just cleared a tooth to follow down near to the radial face of said tooth, the cams being so relatively arranged as to operate in said direction after the ratchet-teeth to depress a pawl where there is space for such depression. Upon a reversal of disk C the cams $d$ come into action to throw the free ends of the pawls near to the radial face of the teeth and leave them there in the track of said teeth to be engaged thereby, to so stop all reverse motion. The engagement of a pawl is nearer synchronous with an attempt to reverse, as its detent end is nearer the radial face of a tooth, and, as above stated, where two or more pawls are used in combination with a wheel having an uneven number of teeth, said engagement may be made, in effect, instantaneous. The shell D may be fast to shaft I to, through its rotation, impart revolution in one direction to the disk C; or the disk C, receiving its rotation from shaft I, may impart a similar movement to the pawl-bearing shell and pulley D. By these means I provide a pawl and ratchet in which the pawl is automatically and positively vibrated independently of gravity or spring power.

Now, having described my invention, what I claim is—

1. The within-described improved pawl and ratchet, consisting of a wheel having its periphery provided with contiguous ratchet-teeth and cams, in combination with a pawl hinged immediately to its ends to an independent support, and having free ends adapted to alternately engage with said ratchet-teeth and cams upon the rotation of the wheel, or of the pawl around the wheel-center, whereby the pawl is vibrated positively to permit or cause a rotation in only one direction, substantially as set forth.

2. The combination, in a pawl and ratchet, of a wheel, B, having its periphery divided into an odd number of teeth, $b$, and cams $d$, and two or more pawls, H H', provided with opposite ends, adapted to alternately engage with said teeth and cams, and relatively arranged to said wheel to cause them simultaneously to be in different stages of vibration, as and for the purpose set forth.

WALDO A. LOUD.

Witnesses:
R. F. HYDE,
J. D. GARFIELD.